Dec. 30, 1924.

P. J. McHUGH

AUTOMOBILE TIRE FILLER

Filed March 17, 1921

Inventor
Patrick J. McHugh
By
Walter F. Murray
Attorney

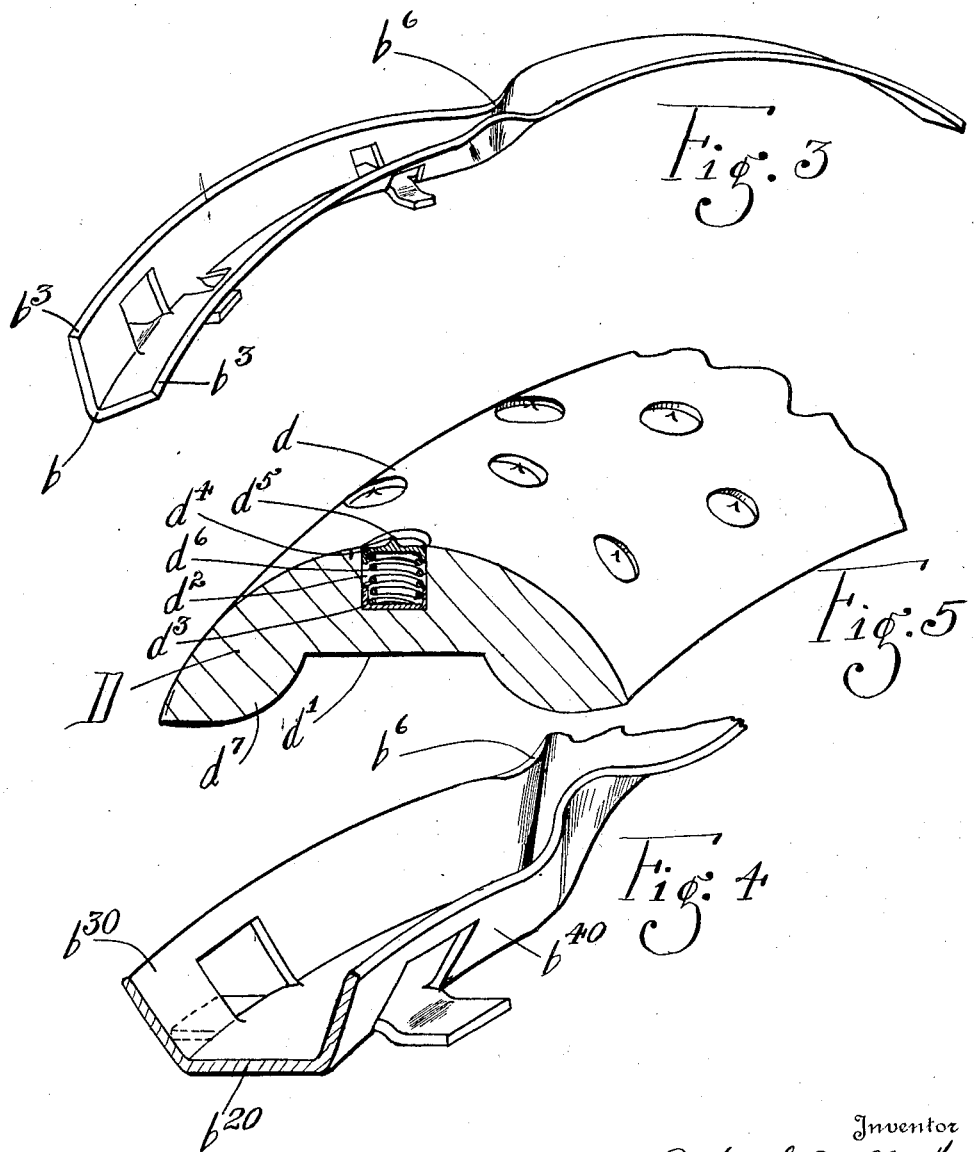

Patented Dec. 30, 1924.

1,520,760

UNITED STATES PATENT OFFICE.

PATRICK J. McHUGH, OF CINCINNATI, OHIO.

AUTOMOBILE TIRE FILLER.

Application filed March 17, 1921. Serial No. 452,932.

*To all whom it may concern:*

Be it known that I, PATRICK J. McHUGH, a citizen of the United States of America, and resident of Cincinnati, in the county of Hamilton and State of Ohio, have invented new and useful Improvements in an Automobile Tire Filler, of which the following is a specification.

An object of my invention is to provide a filler for tire casings, to be used in place of the ordinary air tube and in which the casing will be held normally and yieldingly in the same position as if an air tube were used.

Another object is to provide a filler for the purposes stated which will not injure the inner wall of the casing.

Another object is to provide a simple and efficient filler adapted to prevent slipping of the tire.

These and other objects are attained by the means described herein and disclosed in the accompanying drawing in which:

Fig. 3 is a perspective view of one of the leaf springs forming a detail of my invention.

Fig. 4 is a fragmental view of a modified form of a leaf spring forming a detail of my invention.

Fig. 5 is a fragmental perspective of a shoe forming a detail of my invention.

Figure 1:
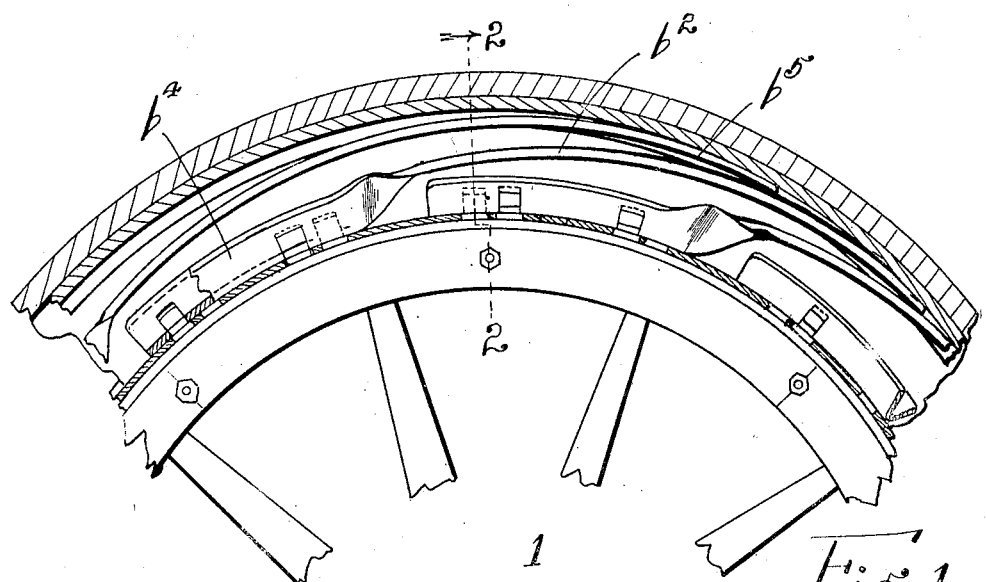
Fig. 1 is a sectional view on line 1—1 of Fig. 2, showing a device embodying my invention.
Figure 2:
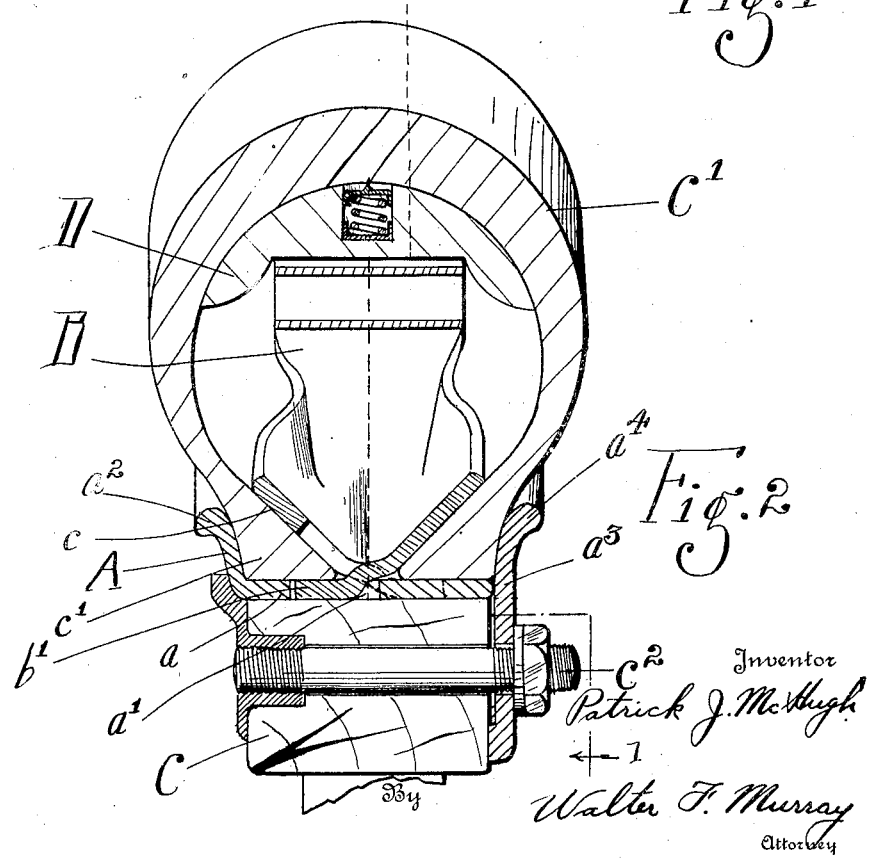
Fig. 2 is a sectional view on line 2—2 of Fig. 1.

My invention comprises a rim A upon which are mounted the leaf springs B bearing upon the shoe D and adapted to retain the casing in a normal position.

The rim or carrier A is mounted on an ordinary felly C in a manner well known in the art. The rim has a base $a$ in which are formed a series of slots $a'$. The rear or inner side of the rim has a rim band $a^2$ formed thereon. The plates $a^3$ adapted to be mounted upon the forward or outer side of the felly C, extend beyond the base $a$ whereby the outer edges $a^4$ of the plates form a rim and adapted to cooperate with the carrier A in retaining the casing C' upon the rim. There are preferably four (4) plates $a^3$ mounted upon the felly C, said plates providing a continuous rim band $a^4$ about the base $a$ of the rim. These plates $a^3$ are secured upon the felly C by means of the bolts $C^2$.

A series of leaf springs B are mounted upon the rim base $a$. The leaf springs comprise a base $b$ from which extend a series of lugs $b'$ adapted to engage in the slots $a'$ formed in the rim base. It is preferable to have a series of lugs formed along the base $b$ of the springs, several of the lugs extending from each side of the base. The base is given an arcuate form so it will engage snugly upon the rim. The wings $b^3$ diverge and extend from the base. The base and wings are preferably so constructed as to give to the combination a V shaped appearance. The wings are extended in this form so that the outer sides $b^4$ of the wings will engage the inner surfaces $c$ of the beads $c'$ of the tire C'. A spring member or leaf $b^2$ is formed on one end of the base and has an arcuate form. The leaf extends outwardly from the base or away from the wheel felly. The leaves $b^2$ extend from the bases in such manner that they will not engage the sides of the casing. To accomplish this the wings are pressed toward one another at their outer ends as shown at $b^6$ in Figs. 3 and 4. Each leaf is adapted to extend over the bases of the two leaf springs next adjacent thereto and the outer or free end of said leaf is adapted to engage upon the outer surface of the leaf of the leaf spring next adjacent thereto. The free ends of the leaves are rounded so as to form a nose that will not injure the shoe D, as shown at $b^5$.

The shoe D has an arcuate outer surface $d$ adapted to contact the inner surface of the tire C' in radial alignment with the tread of the tire. A groove $d'$ is formed in the inner surface $d^7$ of the shoe and in the groove is formed a bearing surface upon which the leaves $b^2$ of the leaf springs are adapted to contact. The shoe may be made of any suitable material such as rubber, compositions of rubber and fabric, etc. Disposed at various places thruout the outer periphery $d$ of the shoe D are a series of bores $d^2$ within which are seated the cups $d^3$. The bores are preferably radial. A cap $d^4$ is mounted in each of the bores $d^2$ and each cap has formed upon its outer end a small pointed projection $d^5$. A spring $d^6$ is contained between the cup $d^3$ and the cap $d^4$, and serves to yieldingly resist movement of the cup and cap toward one another. The projections $d^5$ are adapted to grip or seat upon the inner wall of the casing C' and to prevent relative creeping of the tire and the shoe.

The operation of my device is as follows: We will assume that a tire C' has been mounted upon the rim A and is retained thereupon by means of the plates $a^3$. The plates $a^3$ are retained upon the wheel felly by means of the bolts $C^2$. The pressure upon any section of the tire casing is transmitted thru the shoe D to the leaves of the leaf springs. These springs yieldingly resist this pressure whereby the result is similar to that attained thru the use of pneumatic or ordinary air tubes disposed within the casing. It should be observed that pressure on any one of the leaves is partly taken up by every other leaf because of the engagement of each leaf upon the leaf next adjacent thereto. The spring actuated caps $d^4$ together with the projection $d^5$ thereupon, prevent relative slipping and creeping of the tire and the shoe. The shoe takes up the wear that would otherwise devolve on the inner wall of the casing.

It will be understood that while there is illustrated a carrier in the form of a rim, any suitable type of carrier may be used when desired. If desired the shoe may have a suitable wear resisting band mounted in the groove formed in the inner surface of the shoe.

In the structure disclosed in Fig. 4 the base $b^{20}$ is rather extended laterally whereby to provide a flat contact or foundation for the spring on the carrier. The base is provided with laterally extending lugs in the same manner as in the form shown in Fig. 3. The base $b^{20}$ carries wings $b^{30}$ and $b^{40}$.

What I claim is:

1. The combination of a slotted carrier, and a plurality of leaf springs each comprising a base adapted to seat upon the carrier, laterally extending lugs on the base adapted to seat in the slots in the carrier and to position the leaf spring upon the carrier, each leaf spring extending from the base and overlapping the adjacent leaf spring, the leaf springs being adapted to cooperatively and yieldingly resist pressure on any of the leaves.

2. The combination of a slotted carrier, a plurality of leaf springs each comprising a base adapted to seat upon the carrier, lugs on the base adapted to seat in the slots in the carrier and to position the leaf spring upon the carrier, a leaf extending from the base and overlapping the adjacent leaf spring, the leaf springs being adapted to cooperatively and yieldingly resist pressure on any of the leaves, a shoe mounted on the leaves, a casing mounted on the shoe and encasing the leaf springs and the shoe and means to preclude relative movement of the shoe and the casing.

3. In a tire filler the combination of a shoe, a carrier, means to yieldingly space the shoe from the carrier, a tire casing mounted on the carrier and encasing the yieldable means and the shoe, and upon which the shoe is adapted to bear, means for effecting a binding engagement between the shoe and the casing, and yieldable means operative upon the binding means for retaining the shoe and casing in binding engagement upon one another.

4. In a tire filler the combination of a shoe, having bores therein, a cap reciprocally contained within each bore, yieldable means within the bore operative upon the cap, a carrier, means to yieldingly space the shoe from the carrier, and a tire casing mounted on the carrier and encasing the shoe and the yieldable means operative thereupon, the caps being adapted to preclude relative movement of the casing and the shoe.

In testimony whereof, I have hereunto subscribed my name this 15th day of March, 1921.

PATRICK J. McHUGH.